United States Patent
Hsu et al.

(10) Patent No.: US 10,031,574 B2
(45) Date of Patent: Jul. 24, 2018

(54) APPARATUS AND METHOD FOR CONTROLLING MULTI-CORE PROCESSOR OF COMPUTING SYSTEM

(71) Applicant: MediaTek Inc., Hsin-Chu (TW)

(72) Inventors: Jih-Ming Hsu, Taoyuan (TW); Yen-Lin Lee, Zhubei (TW); Jia-Ming Chen, Zhubei (TW); Shih-Yen Chiu, Hsinchu (TW); Chung-Ho Chang, Zhubei (TW); Ya-Ting Chang, Hsinchu (TW); Ming-Hsien Lee, Hsinchu (TW)

(73) Assignee: MEDIATEK INC., Hsin-Chu (TW)

( * ) Notice: Subject to any disclaimer, the term of this patent is extended or adjusted under 35 U.S.C. 154(b) by 221 days.

(21) Appl. No.: 14/845,879

(22) Filed: Sep. 4, 2015

(65) Prior Publication Data
US 2016/0342198 A1 Nov. 24, 2016

Related U.S. Application Data

(60) Provisional application No. 62/164,129, filed on May 20, 2015.

(51) Int. Cl.
*G06F 1/32* (2006.01)
(52) U.S. Cl.
CPC ............ *G06F 1/3296* (2013.01); *G06F 1/324* (2013.01); *Y02D 10/126* (2018.01); *Y02D 10/172* (2018.01)
(58) Field of Classification Search
CPC .............. Y02B 60/142; Y02B 60/1217; Y02B 60/1285; G06F 9/5044; G06F 1/324; G06F 1/3296; G06F 9/5094; G06F 1/3243
See application file for complete search history.

(56) References Cited

U.S. PATENT DOCUMENTS

| 9,477,296 B2* | 10/2016 | Gwak | G06F 1/3287 |
| 9,626,307 B2* | 4/2017 | Kim | G06F 13/102 |
| 2005/0034002 A1* | 2/2005 | Flautner | G06F 1/3203 713/322 |
| 2006/0026447 A1* | 2/2006 | Naveh | G06F 1/3203 713/322 |

(Continued)

OTHER PUBLICATIONS

Arlitt, M.f., and C.I. Williamson. "Internet Web Servers: Workload Characterization and Performance Implications." IEEE/ACM Transactions on Networking, vol. 5, No. 5, 1997, pp. 631-645., doi:10.1109/90.649565.*

(Continued)

*Primary Examiner* — Jaweed A Abbaszadeh
*Assistant Examiner* — Brian J Corcoran
(74) *Attorney, Agent, or Firm* — McClure, Qualey & Rodack, LLP (57) ABSTRACT

A computing system includes a multi-core processor and a core controller. The core controller is for: monitoring utilization of the multi-core processor; calculating a target performance index according to the utilization of the multi-core processor, a target utilization and a first performance index, wherein the first performance index is associated with a first entry of a dynamic voltage frequency scaling (DVFS) table that corresponds to a current setting for the multi-core processor; and selecting a second entry of the DVFS table that corresponds to a target-setting according to the target performance index and a second performance index that is associated with the second entry. The target-setting is used to configure the multi-core processor.

20 Claims, 8 Drawing Sheets

300_1, 210, 220, 230

| P | F1 | V1 | Q | F2 | V2 | A | B |
|---|----|----|----|----|----|------|-----|
| 1 | Freq_b1 | Volt_b1 | 0 | None | None | 8100 | 863 |
| 0 | None | None | 1 | Freq_L1 | Volt_L1 | 6500 | 524 |

300_7, 210, 220, 230

| P | F1 | V1 | Q | F2 | V2 | A | B |
|---|----|----|----|----|----|------|-----|
| 3 | Freq_b1 | Volt_b1 | 4 | Freq_L1 | Volt_L1 | 34131 | 5176 |
| 3 | Freq_b1 | Volt_b1 | 4 | Freq_L2 | Volt_L1 | 31397 | 4235 |

300_8

| P | F1 | V1 | Q | F2 | V2 | A | B |
|---|----|----|----|----|----|------|-----|
| 4 | Freq_b1 | Volt_b1 | 4 | Freq_L1 | Volt_L1 | 41292 | 6572 |
| 4 | Freq_b1 | Volt_b1 | 4 | Freq_L2 | Volt_L1 | 41584 | 6339 |
| ⋮ | ⋮ | ⋮ | ⋮ | ⋮ | ⋮ | ⋮ | ⋮ |
| 4 | Freq_b2 | Volt_b2 | 4 | Freq_L2 | Volt_L1 | 37413 | 5071 |

210, 220, 230

(56) References Cited

U.S. PATENT DOCUMENTS

| | | | | |
|---|---|---|---|---|
| 2006/0090161 A1* | 4/2006 | Bodas | ................... | G06F 9/5044 718/100 |
| 2007/0156370 A1* | 7/2007 | White | ..................... | G06F 1/206 702/132 |
| 2009/0015232 A1* | 1/2009 | Rozen | ....................... | G06F 1/26 323/318 |
| 2011/0047401 A1* | 2/2011 | Werner | ................ | G06F 1/3203 713/500 |
| 2011/0099397 A1* | 4/2011 | Rotem | ................... | G06F 1/206 713/320 |
| 2011/0113270 A1* | 5/2011 | Carter | .................... | G06F 1/324 713/320 |
| 2014/0068285 A1* | 3/2014 | Lee | ........................ | G06F 1/324 713/300 |
| 2014/0101411 A1* | 4/2014 | Sakarda | ................ | G06F 9/3885 712/42 |
| 2016/0085596 A1* | 3/2016 | Nakagawa | ............ | G06F 9/5094 718/104 |
| 2016/0313785 A1* | 10/2016 | Kumar | ..................... | G06F 1/26 |

OTHER PUBLICATIONS

Pu, Xing, et al. "Understanding Performance Interference of I/O Workload in Virtualized Cloud Environments." 2010 IEEE 3rd International Conference on Cloud Computing, 2010, doi:10.1109/cloud.2010.65.*
U.S. Appl. No. 14/811,851, filed Jul. 29, 2015 (copy not provided).
Sekar, K.; "Power and Thermal Challenges in Mobile Devices;" Oct. 2013; pp. 1-23.

* cited by examiner

FIG. 1

| | 210 | | | 220 | | 230 | |
|---|---|---|---|---|---|---|---|
| P | F1 | V1 | Q | F2 | V2 | A | B |
| 4 | Freq_b1 | Volt_b1 | 4 | Freq_L1 | Volt_L1 | 41292 | 6572 |
| 4 | Freq_b1 | Volt_b1 | 4 | Freq_L2 | Volt_L1 | 41584 | 6339 |
| 4 | Freq_b2 | Volt_b1 | 4 | Freq_L1 | Volt_L1 | 40273 | 6192 |
| 4 | Freq_b2 | Volt_b1 | 4 | Freq_L2 | Volt_L1 | 39729 | 5861 |
| 4 | Freq_b1 | Volt_b2 | 4 | Freq_L1 | Volt_L1 | 39001 | 5754 |
| 4 | Freq_b1 | Volt_b2 | 4 | Freq_L2 | Volt_L1 | 38524 | 5503 |
| 4 | Freq_b2 | Volt_b2 | 4 | Freq_L1 | Volt_L1 | 37646 | 5318 |
| 4 | Freq_b2 | Volt_b2 | 4 | Freq_L2 | Volt_L1 | 37413 | 5071 |
| 3 | Freq_b1 | Volt_b1 | 4 | Freq_L1 | Volt_L1 | 34131 | 5176 |
| 3 | Freq_b1 | Volt_b1 | 4 | Freq_L2 | Volt_L1 | 31397 | 4235 |
| ... | ... | ... | ... | ... | ... | ... | ... |
| 1 | Freq_b1 | Volt_b1 | 0 | None | None | 8100 | 863 |
| 0 | None | None | 1 | Freq_L1 | Volt_L1 | 6500 | 524 |

Table 300_1:

| P | F1 | V1 | Q | F2 | V2 | A | B |
|---|---|---|---|---|---|---|---|
| 1 | Freq_b1 | Volt_b1 | 0 | None | None | 8100 | 863 |
| 0 | None | None | 1 | Freq_L1 | Volt_L1 | 6500 | 524 |

Table 300_7:

| P | F1 | V1 | Q | F2 | V2 | A | B |
|---|---|---|---|---|---|---|---|
| 3 | Freq_b1 | Volt_b1 | 4 | Freq_L1 | Volt_L1 | 34131 | 5176 |
| 3 | Freq_b1 | Volt_b1 | 4 | Freq_L2 | Volt_L1 | 31397 | 4235 |

Table 300_8:

| P | F1 | V1 | Q | F2 | V2 | A | B |
|---|---|---|---|---|---|---|---|
| 4 | Freq_b1 | Volt_b1 | 4 | Freq_L1 | Volt_L1 | 41292 | 6572 |
| 4 | Freq_b1 | Volt_b1 | 4 | Freq_L2 | Volt_L1 | 41584 | 6339 |
| ..... | ..... | ..... | ..... | ..... | ..... | ..... | ..... |
| 4 | Freq_b2 | Volt_b2 | 4 | Freq_L2 | Volt_L1 | 37413 | 5071 |

| # | | | | | | |
|---|---|---|---|---|---|---|
| 16 | 0L | OPP0 | 4LL | OPP1 | 2002 | 590 |
| 17 | 3L | OPP5 | 1LL | OPP5 | 1801 | 581 |
| 18 | 4L | OPP6 | 0LL | OPP0 | 1586 | 489 |
| 19 | 1L | OPP4 | 3LL | OPP4 | 1580 | 480 |
| 20 | 2L | OPP5 | 2LL | OPP5 | 1547 | 477 |
| 21 | 0L | OPP0 | 4LL | OPP2 | 1768 | 474 |
| 22 | 0L | OPP1 | 3LL | OPP1 | 1502 | 454 |
| 23 | 3L | OPP6 | 1LL | OPP6 | 1385 | 425 |
| 24 | 1L | OPP5 | 3LL | OPP5 | 1294 | 374 |
| 25 | 0L | OPP0 | 3LL | OPP2 | 1326 | 365 |
| 26 | 0L | OPP6 | 4LL | OPP3 | 1508 | 364 |
| 27 | 2L | OPP7 | 2LL | OPP6 | 1183 | 349 |
| 28 | 4L | OPP0 | 0LL | OPP0 | 1118 | 337 |
| 29 | 0L | OPP7 | 2LL | OPP1 | 1001 | 317 |
| 30 | 3L | OPP0 | 1LL | OPP7 | 975 | 294 |
| 31 | 0L | OPP4 | 4LL | OPP4 | 1274 | 284 |
| 32 | 0L | OPP3 | 3LL | OPP3 | 1131 | 280 |

| 16 | 1L | OPP3 | 4LL | OPP3 | 2249 | 698 |
| 17 | 4L | OPP6 | 4LL | OPP6 | 2366 | 646 |
| 18 | 0L | OPP0 | 4LL | OPP1 | 2002 | 590 |
| 19 | 2L | OPP5 | 4LL | OPP5 | 2067 | 579 |
| 20 | 1L | OPP4 | 4LL | OPP4 | 1898 | 545 |
| 21 | 3L | OPP6 | 4LL | OPP6 | 1970 | 534 |
| 22 | 0L | OPP0 | 4LL | OPP2 | 1768 | 474 |
| 23 | 0L | OPP0 | 3LL | OPP1 | 1502 | 454 |
| 24 | 4L | OPP7 | 4LL | OPP7 | 1664 | 445 |
| 25 | 1L | OPP5 | 4LL | OPP5 | 1554 | 425 |
| 26 | 2L | OPP6 | 4LL | OPP6 | 1573 | 421 |
| 27 | 3L | OPP7 | 4LL | OPP7 | 1385 | 368 |
| 28 | 0L | OPP0 | 3LL | OPP2 | 1326 | 365 |
| 29 | 0L | OPP0 | 4LL | OPP3 | 1508 | 364 |
| 30 | 0L | OPP0 | 2LL | OPP1 | 1001 | 317 |
| 31 | 4L | OPP8 | 4LL | OPP8 | 962 | 312 |
| 32 | 1L | OPP6 | 4LL | OPP6 | 1177 | 309 |

APPARATUS AND METHOD FOR CONTROLLING MULTI-CORE PROCESSOR OF COMPUTING SYSTEM

CROSS REFERENCE TO RELATED APPLICATIONS

This application claims the benefit of U.S. Provisional Application No. 62/164,129 filed on May 20, 2015, the entirety of which is incorporated by reference herein.

BACKGROUND OF THE INVENTION

Field of the Invention

The invention generally relates to a method and an apparatus for controlling the operation of a plurality of processor cores within a computing system, and more particularly, to a method for controlling the operating frequencies and turning on and off power to processor cores within a computing system, and an apparatus thereof.

Description of the Related Art

As computation complexity has increased, it has become increasingly prevalent to employ multiple processors to execute different portions of one or more computer programs in parallel on different processors. To this end, the microprocessors currently in use normally integrate multiple processing cores in contrast to several years ago, when single core microprocessors were the rule.

While the advantage of multi-core processing is well known, efficient management of the multi-core is sometimes a very complicated job. The challenge lies in determining how many cores should be turned on to exploit the proper degree of parallelism, and under what clock frequency the turned-on cores should operate so that fewer computation resources are wasted. The problem is further complicated because the operating constraints (e.g. power budget and workload) may keep changing. Thus, it is desirable to devise a robust and efficient approach for managing the operation of the multi-core.

BRIEF SUMMARY OF THE INVENTION

A computing system and a multi-core processor operation control method are provided. An exemplary embodiment of the computing system comprises a multi-core processor and a core controller. The core controller is configured for doing the following: monitoring utilization of the multi-core processor; calculating a target performance index according to the utilization of the multi-core processor, a target utilization and a first performance index, wherein the first performance index is associated with a first entry of a dynamic voltage frequency scaling (DVFS) table that corresponds to a current setting for the multi-core processor; and selecting a second entry of the DVFS table that corresponds to a target-setting according to the target performance index and a second performance index that is associated with the second entry. The target-setting is used to configure the multi-core processor.

An exemplary embodiment of the multi-core processor operation control method is provided. The multi-core processor operation control method comprises the steps of: monitoring utilization of the multi-core processor; calculating a target performance index according to the utilization of the multi-core processor, a target utilization and a first performance index, wherein the first performance index is associated with a first entry of a dynamic voltage frequency scaling (DVFS) table that corresponds to a current setting for the multi-core processor; selecting a second entry of the DVFS table that corresponds to a target-setting according to the target performance index and a second performance index that is associated with the second entry; and configuring the multi-core processor using the target-setting.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

Various embodiments of the invention are described with reference to the accompanying drawings in detail. The same reference numbers are used throughout the drawings to refer to the same or like components. These embodiments are made for the purpose of illustrating the general principles of the invention and should not be taken in a limiting sense. Detailed description of well-known functions and structures are omitted to avoid obscuring the subject matter of the invention.

Embodiments of the present invention may be used in any computing system, for example, a graphics processing system, an entertainment system, a media system, a game system, a communication device, a workstation, a desktop computer, a laptop computer, a mobile phone, or any system having a multi-core processor.

Figure 1:
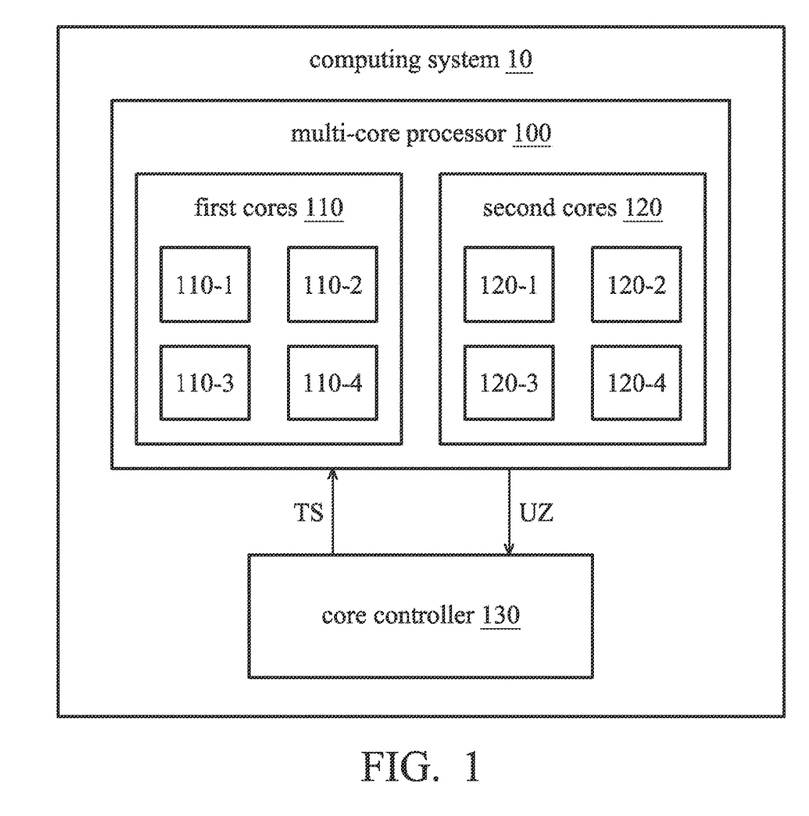
FIG. 1 is a block diagram illustrating a configuration of a computing system including a multi-core processor according to an embodiment of the invention.

The multi-core processor may have a heterogeneous computing architecture which couples slower, low-power processor cores with more powerful and power-hungry ones. Please refer to FIG. 1. FIG. 1 is a functional block diagram of a computer system 10 with a multi-core processor 100 according to an embodiment of the present invention. The multi-core processor 100 has a plurality of first cores 110 (110-1 through 110-4) and a plurality of second cores 120 (120-1 through 120-4). In the embodiment, the multi-core processor 100 is a system on a chip (SOC). The multi-core processor 100 combines a plurality of first cores 110 with a plurality of second cores 120. The first cores 110 and the second cores 120 are architecturally compatible, such that the same instructions can be executed either by the first cores 110 or by the second cores 120. In the embodiment, the number of first cores 110 is equal to four, and the number of second cores 120 is also equal to four. However, the present invention is not limited thereto. The number of first cores 110 and the number of second cores 120 may be equal to other positive integers.

Moreover, the performance of each first core 110 is greater than that of each second core 120, and the energy efficiency of each second core 120 is greater than that of each first core 110. In other words, the power consumed by each active first core 110 is greater than that of an active second core 120, and the performance of the active first core 110 in executing instructions is better than that of the active second core 120 when executing the same instructions. Accordingly, high-performance cores (i.e. the first cores 110) with energy efficient cores (i.e. the second cores 120) are combined on the same SOC (System-on-Chip) to reduce energy consumption (and hence preserve battery power), while still delivering peak performance. Since the first cores 110 and the second cores 120 are architecturally compatible, workloads of the computer system 10 can be allocated to each core, on demand, to suit performance needs. High intensity tasks such as games are attempted to be allocated to the first cores 110, for example, while less demanding tasks such as email and audio playback are attempted to be allocated to the second cores 120.

In another embodiment of the present invention, the first cores 110 are embedded in a central processing unit (CPU) of the computing system 10, and the second cores 120 are embedded in a graphic processing unit (GPU) of the computing system 10. Recent studies suggest that using CPU and GPU together is a more efficient way of computing compared with using CPU or GPU alone. Data show that different types of computing processing units may be better suited to different types of workloads. For example, CPU is generally good at control-intensive workloads while GPU performs well at computing-intensive tasks.

In the present invention, a novel Dynamic Voltage and Frequency Scaling (DVFS) scheme which is different from any of the related art (if exists) is provided to dynamically manage power of the multi-core processor 100. As a result of applying the DVFS scheme of this embodiment to the multi-core processor 100, one or more operating frequencies and one or more operating voltages can be applied to the first cores 110, and one or more operating frequencies and one or more operating voltages can be applied to the second cores 120. Once an operating frequency and an operating voltage are applied to any first core 110 or any second core 120, the first core 110 or the second core 120 is active. In other words, if any first core 110 or any second core 120 does not have an operating frequency (i.e. the operating frequency is equal to 0 Hz) or any operating voltage (i.e. the operating voltage is equal to 0 volts), the first core 110 or the second core 120 is not active. The operating frequency of the active first core 110 may be different from the operating frequency of the active second core 120, and the operating voltage of the active first core 110 may be different from the operating voltage of the active second core 120. However, the present invention is not limited thereto. That is, the operating frequency of the active first core 110 may be the same as the operating frequency of the active second core 120, and the operating voltage of the active first core 110 may be the same as the operating voltage of the active second core 120. Moreover, in an embodiment of the present invention, each active first core 110 is supplied with the same operating frequency and the same operating voltage, and the same operating frequency and the same operating voltage are applied to each active second core 120. According to one embodiment, the DVFS scheme may be executed by the core controller 130, which will be described in greater detail later.

Figure 2:
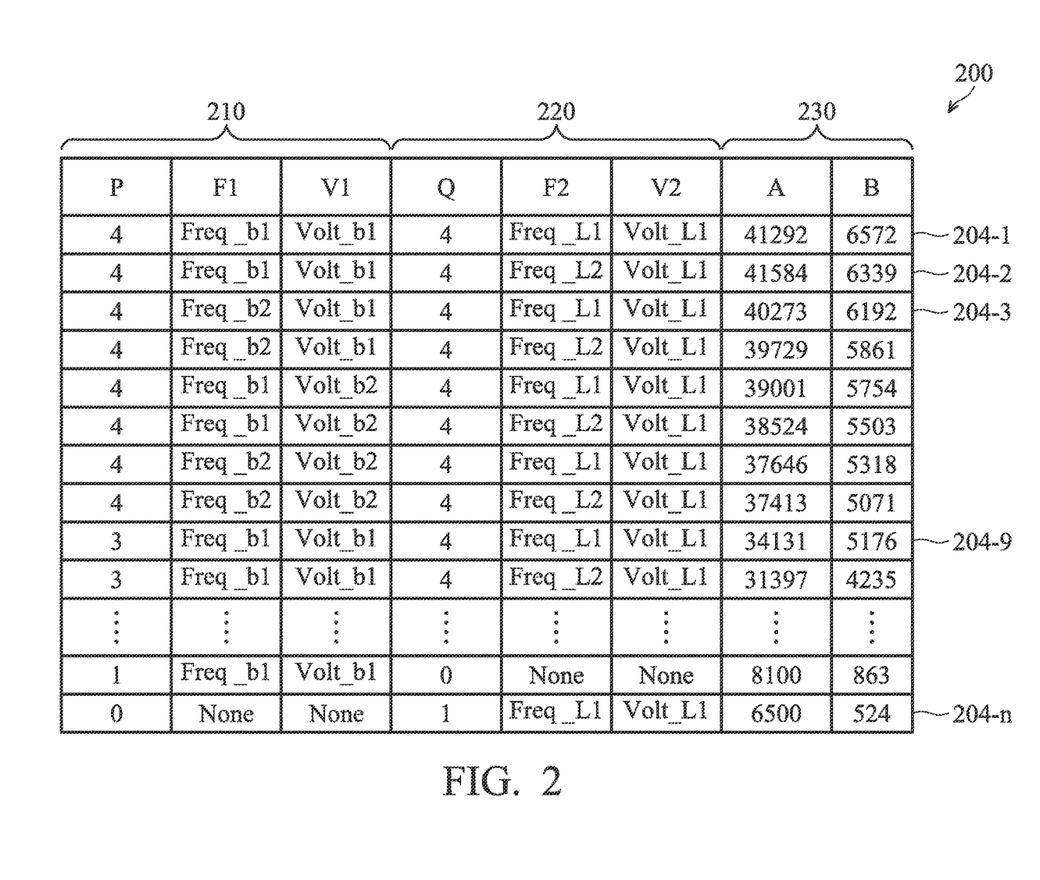
FIGS. 2 and 3 illustrate data structures of DVFS tables according to some embodiments of the invention.

According to the previously described power management process executed by the computing system 10, at least one dynamic voltage and frequency scaling (DVFS) table 200, as shown in FIG. 2, may be generated by the computing system 10. The DVFS table 200 has a plurality of entries 204-1 through 204-$n$, where n is a positive integer. Each of the entries 204-1 through 204-$n$ has three portions: first settings 210, second settings 220 and reference indexes 230. As shown in FIG. 2, the first settings 210 comprises fields of first number P, first operating frequency F1 and first operating voltage V1, the second settings 220 comprises fields of second number Q, second operating frequency F2 and second operating voltage V2, and the category of reference indexes 230 comprises fields of performance index A and power index B. The first number P indicates the number of active first cores 110, and the second number Q indicates the number of active second cores 120.

The fields of the performance index A and the power index B are reference fields. The multi-core processor 100 may select an entry among 204-1 through 204-$n$ from the DVFS table 200 by referencing the values of the fields of the performance index A and the power index B. The value of the performance index A indicates a quantified value of the performance of the multi-core processor 100 when the first cores 110 and the second cores 120 are configured according to a selected entry among 204-1 through 204-$n$. For example, when the entry 204-3 is selected to configure the multi-core processor 100, the performance index A of the multi-core processor 100 under such a selection is 40273. The greater the value of the performance index A, the higher performance the multi-core processor 100 exhibits. Similarly, the value of the power index B indicates a quantified value of power required by the multi-core processor 100 when the first cores 110 and the second cores 120 are configured according to the selected entry among 204-1 through 204-$n$. The greater the value of the power index B, the greater power of the multi-core processor 100 is required. Therefore, one of the entries 204-1 through 204-$n$ may be selected from the DVFS table 200 according to a power budget and/or a required performance of the multi-core processor 100 by referencing the values of the fields of the performance index A and the power index B. Accordingly, the power and performance of the multi-core processor 100 may fit a predetermined condition that the power consumed by the multi-core processor 100 is not greater than the power budget and/or that the performance of the multi-core processor 100 is not less than the required performance.

For instance, consider the entry 204-9 is selected to configure the multi-core processor 100. Then, the first cores 110 are configured according to the first settings 210 of the selected entry 204-9 with 3 first cores 110 active, the operating frequency of the 3 active first cores 110 being Freq_b1, and the operating voltage of the 3 active first cores 110 being Volt_b1. Similarly, the second cores 120 are configured according to the second settings 220 of the selected entry 204-9 with 4 second cores 120 active, the operating frequency of the 4 active second cores 120 being Freq_L2, and the operating voltage of the 4 active second cores 120 being Volt_L1.

Figure 3:
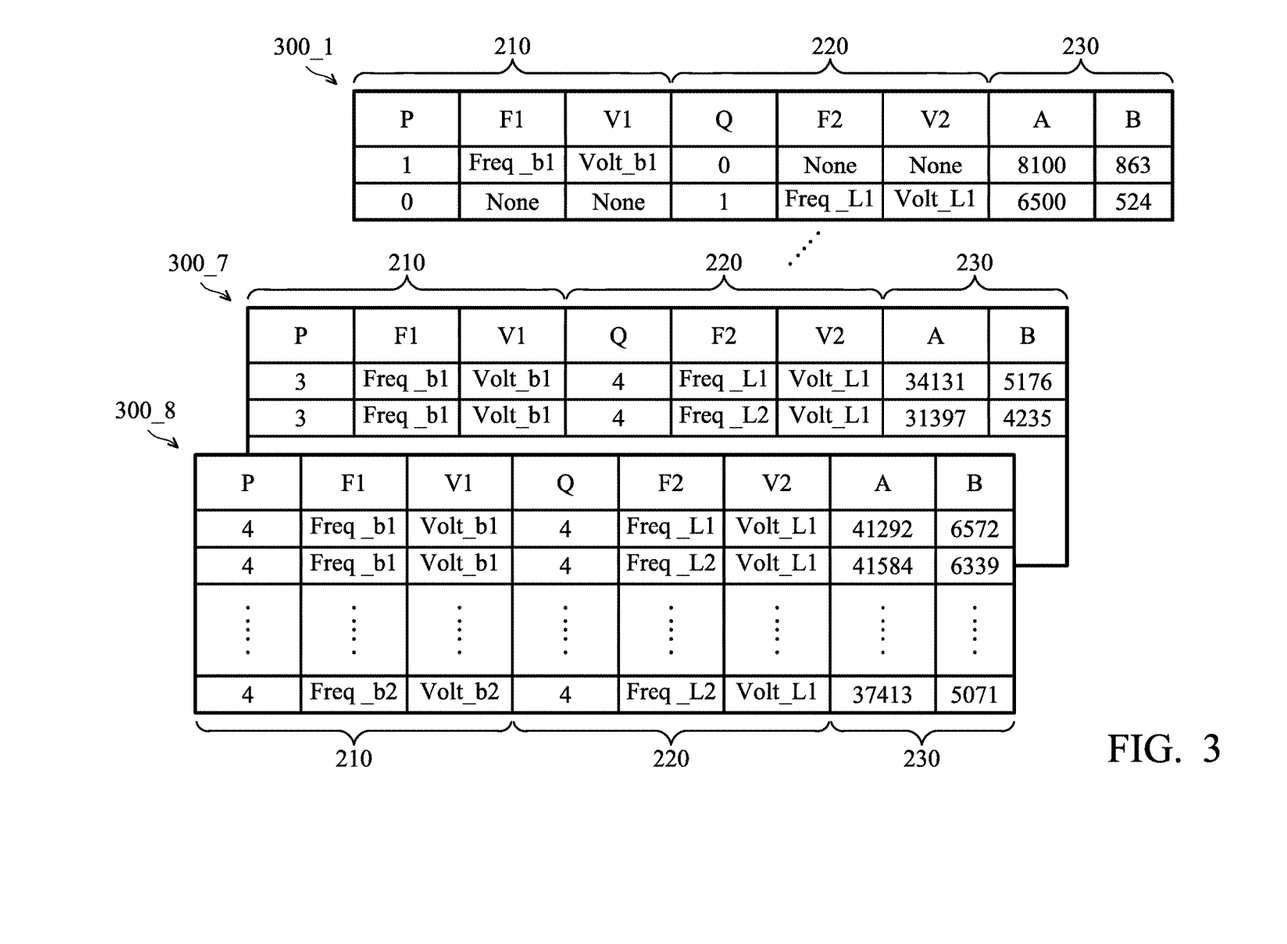

Please refer to FIG. 3 for other kinds of DVFS tables that can be utilized to configure the multi-core processor 100. Each of the DVFS tables 300_1 through 300_8 corresponds to a unique value of thread level parallelism (TLP). For example, the DVFS table 300_1 corresponds to TLP with a value of 1, the DVFS table 300_7 corresponds to TLP with a value of 7, and the DVFS table 300_8 corresponds to TLP with a value of 8. According to one embodiment of the present invention, for the multi-core processor 100 to select a target entry among all entries of the DVFS tables 300_1 through 300_8, the multi-core processor 100 first selects one of the DVFS tables 300_1 through 300_8 according to the current TLP and then selects the target entry from the selected DVFS table according to a power budget or a required performance of the multi-core processor 100. More specifically, the DVFS tables shown in FIG. 4A and FIG. 4B respectively more clearly shows entries of the DVFS tables 300_4 (TLP=4) and 300_8 (TLP=8). Note that the DVFS tables mentioned above may be stored in a storage unit (not drawn) of the computing system 10.

According to one embodiment of the present invention, the multi-core processor 100 determines the current thread level parallelism (TLP) of the computing system 10. In an embodiment of the present invention, the current TLP is the sum of the number of active first cores 110 and the number of active second cores 120. In another embodiment of the present invention, the current TLP is calculated according to the number of running tasks in run queues of the operating system (OS) of the computer system 10. In an embodiment of the present invention, the current TLP is calculated according to the sum of the workload of the first cores 110 and the second cores 120.

According to an embodiment of the present invention, the core controller 130 provides the target-setting TS to control on/off and operating point (e.g. operating voltage and operating frequency) of the multi-core processor 100 by monitoring the utilization UZ of the multi-core processor 100 with the help of DVFS tables similar to those shown above. The core controller 130 may comprise software instruction sets which are executed by one of the multi-core processors 100 (e.g. 110-1 or 120-1) to monitor and control the operation of the first cores 110-1 through 110-4 and the second cores 120-1 through 120-4. However, the core controller 130 may be implemented by dedicated hardware circuits or in combination of firmware as understood by one of ordinary skill in the art.

Utilization (or core utilization) is typically calculated by detecting if the core is halted when a periodic timer interrupt on the platform is fired. For a multi-core like the multi-core processor 100, the utilization UZ may be the average utilization of all the power-on cores. In one embodiment, the utilization UZ of the multi-core processor 100 is obtained by the cores controller 130.

Figure 4A:
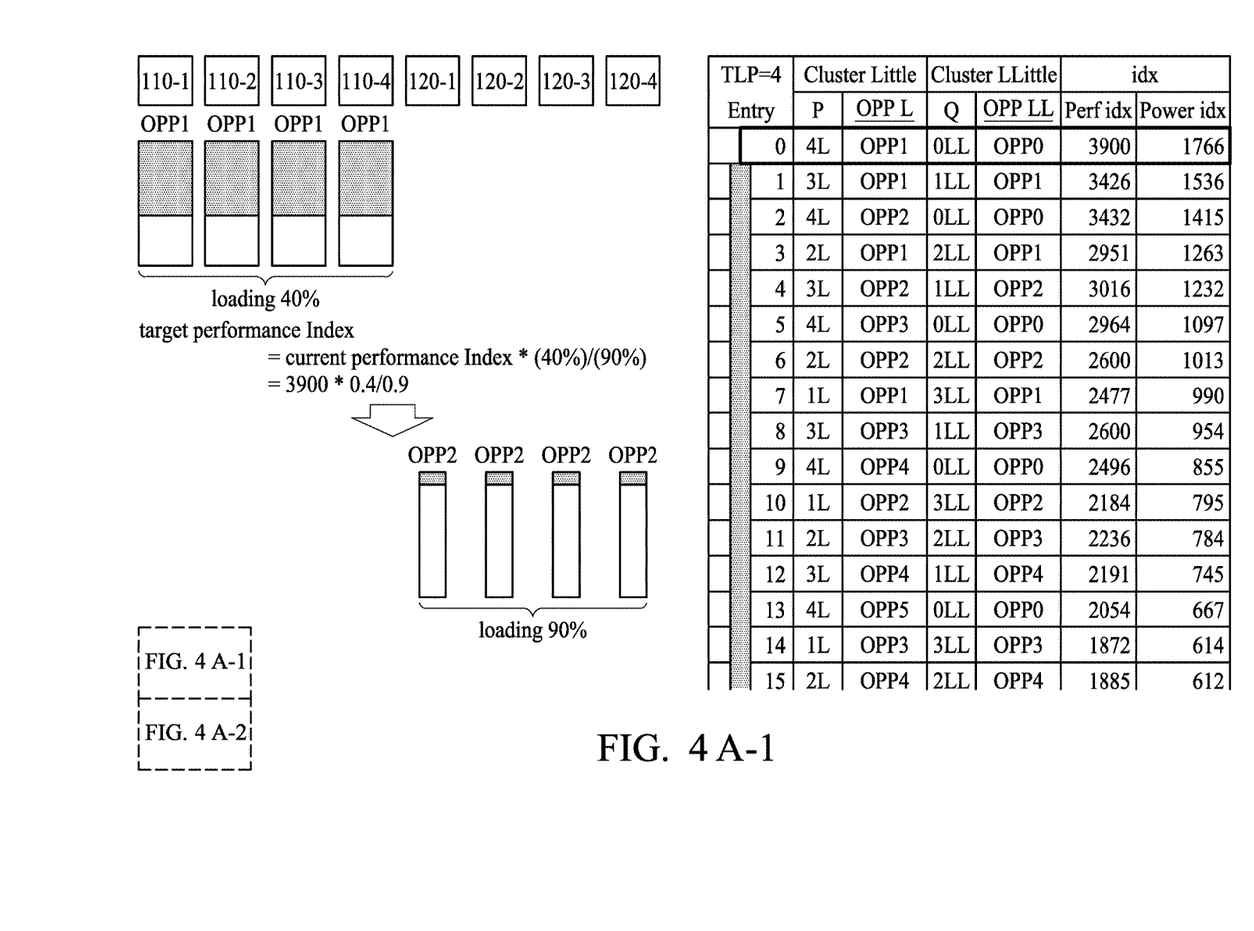
FIG. 4A composed of FIGS. 4A-1 and 4A-2 2 (thus, FIGS. 4A-1 and 4A-2 are collectively referred to herein as FIG. 4A) shows how operation of the multi-core processor of FIG. 1 may be tracked and adjusted according to some other embodiments of the invention.
FIG. 4B composed of FIGS. 4B-1 and 4B-2 (thus, FIGS. 4B-1 and 4B-2 are collectively referred to herein as FIG. 4B) shows how operation of the multi-core processor of FIG. 1 may be tracked and adjusted according to some other embodiments of the invention.
Figure 4A:
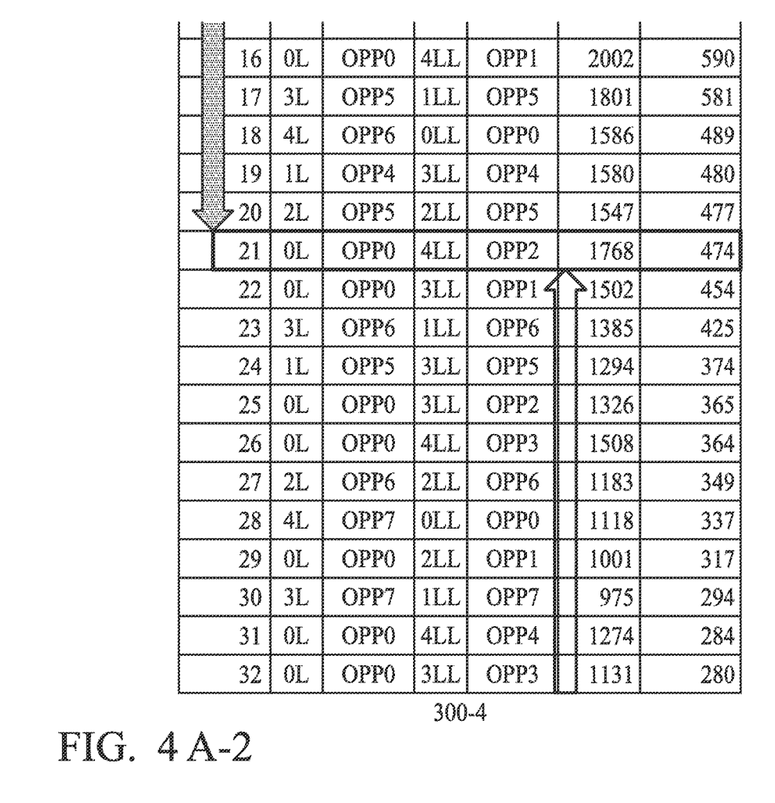
Figure 4B:
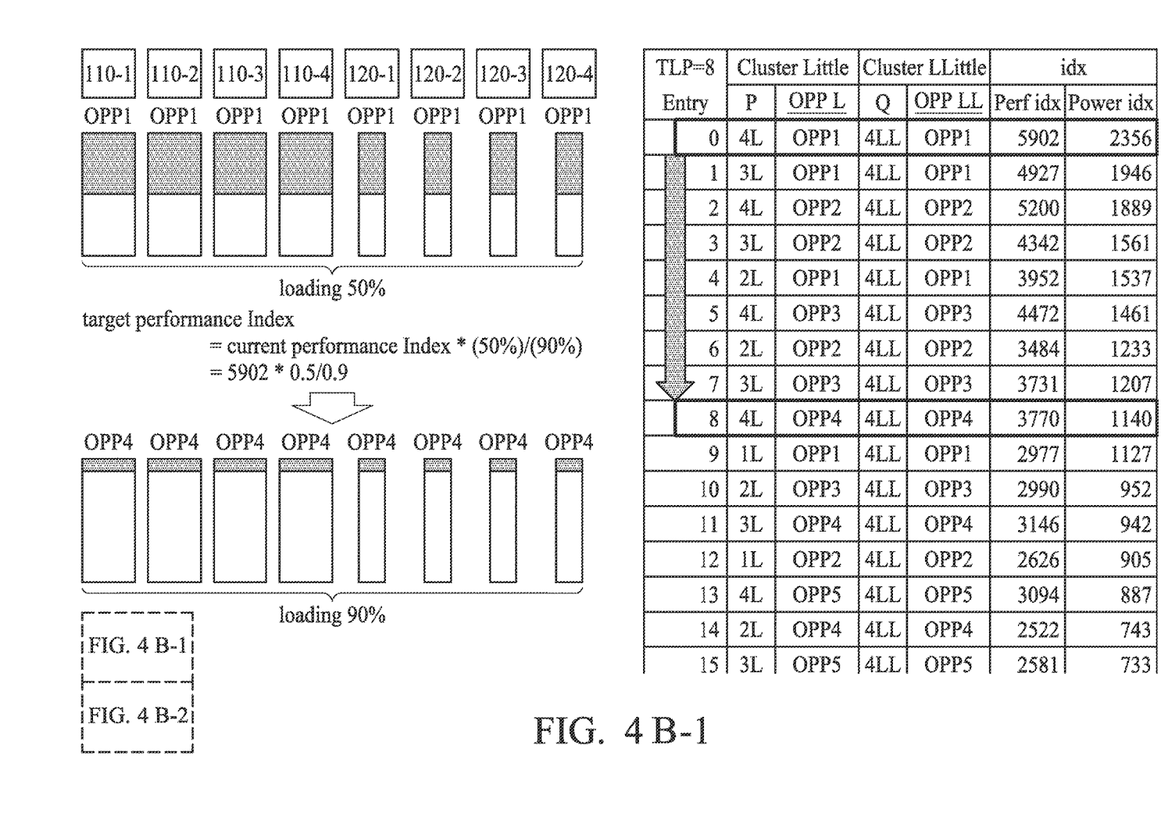
Figure 4B:
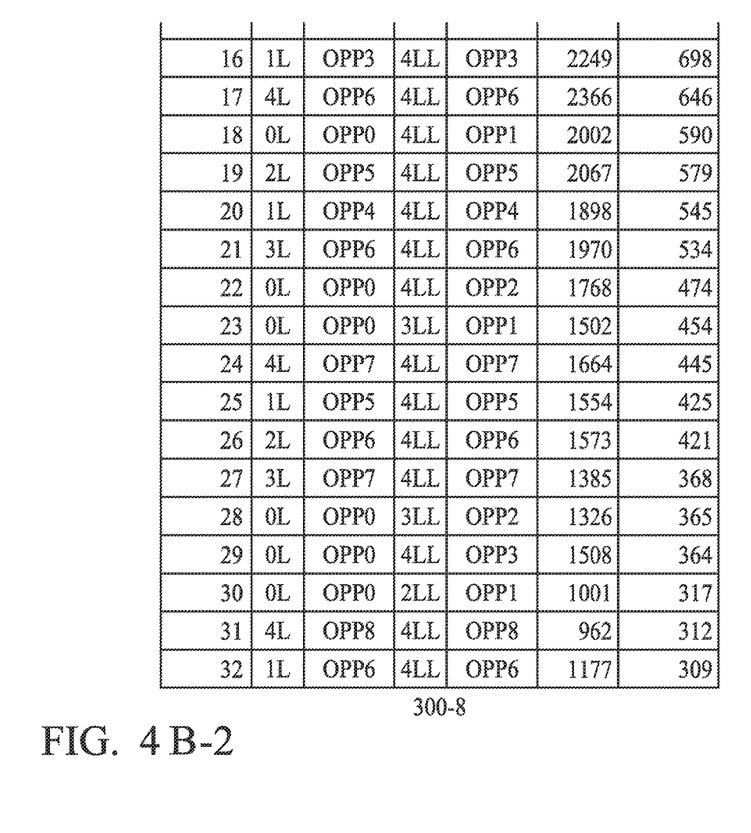

FIG. 4A illustrates an example showing how the performance of the multi-core 100 is tracked and fine-tuned by the core controller 130. For illustration purposes, the first cores 110-1 through 110-4 are referred to "Cluster Little" and the second cores 120-1 through 120-4 are referred to "Cluster LLittle" in the DVFS table 300_4. Also, OPP_L stands for the operating point for the first cores 110 (denoted as F1 and V1 in FIG. 3) whereas OPP_LL stands for the operating point for the second cores 120 (denoted as F2 and V2 in FIG. 3). Here, it is assumed that the multi-core processor 100 currently adopts the setting in entry 0, where cores 110-1 through 110-4 are all active (or turned-on) at operating point OPP1 and core 120-1 through 120-4 are all inactive (or turned-off). The core controller 130 monitors the utilization UZ and finds out that, under the setting of entry 0, the utilization UZ of the multi-core 100 is 40%. Then, the core controller 130 calculates a target performance index using the formula F1: target performance index=current performance index*(UZ/target utilization), where the current performance index is the performance index under the current setting (3900) and the target utilization may be a predetermined value representing a desired utilization of the multi-core 100. In this example, we suppose the target utilization is 90% and the target performance index would be around 1733 (3900*40%/90%). Afterwards, the core controller 130 refers to the DVFS table 300-4 and compares the performance index of entries of the table to obtain the target-setting TS. For instance, the core controller 130 may select an entry having a performance index larger than, yet closest to, the target performance. In this case, the 21st entry of the DVFS table 300-4 would be selected. The core controller 130 may then configure the multi-core processor 100 using the 21st entry so that the cores 110-1 through 110-4 are turned from on to off and the cores 120-1 through 120-4 are turned from off to on to work at operating point OPP2. Note that once acquiring the target-setting TS for configuring the multi-core 100, the core controller 130 may also forward the target-setting TS for another module (e.g. a power management circuit) to configure the multi-core processor 100 using the target-setting TS. As the multi-core processor 100 is configured using the 21st entry, the utilization UZ of the multi-core processor 100 may approach the target utilization (90%) that is achieved through turning all the cores in "Cluster LLittle" on at operating point OPP2 while turning all the cores in "Cluster Little" off. Note that, in some cases, a power budget of the computing system 10 may be given and the core controller 130 needs to select an entry having not only a performance index larger than the target performance but a power index smaller than the power budget of the computing system 10.

FIG. 4B illustrates another example showing how the performance of the multi-core 100 is tracked and fine-tuned by the core controller 130. Here, it is assumed that the multi-core processor 100 currently adopts the setting in entry 0, where cores 110-1 through 110-4 are all active (or turned-on) at operating point OPP1 and core 120-1 through 120-4 are all active at operating point OPP1 as well. The core controller 130 monitors the utilization UZ and finds out that, under the setting of entry 0, the utilization UZ of the multi-core 100 is 50%. Then, the core controller 130 calculates a target performance index using the formula F1 above. In FIG. 4B, we suppose the target utilization is 90% and thus the target performance index would be around 3279 (5902*50%/90%). Afterwards, the core controller 130 refers to the DVFS table 300-8 and compares the performance index of entries of the table to obtain the target-setting TS. For instance, the core controller 130 may select an entry having a performance index larger than the target performance while having the smallest power index. In this case, the 8th entry of the DVFS table 300-8 would be selected. The core controller 130 may then configure the multi-core processor 100 using the 8th entry so that the cores 110-1 through 110-4 and the cores 120-1 through 120-4 still all remain turned-on but all switch to work at operating point OPP4.

Note that the target performance index derived from the formula F1 may be further adjusted using a run queue length of the computing system 10. The run queue length may indicate how many tasks are currently queued in a operating system (OS) run queue. As the run queue length increases, the number of tasks/jobs passed from OS waiting to be executed by the multi-core processor 100 increases. To maintain smooth performance and good user experience, enough computing resource needs to be provided. As an example, the target performance index may be calculated by using formula F2: target performance index=current performance index*(UZ/target utilization)+run queue length*W, where W is a scaling factor that might be changed by the core controller 130.

Based on description above, the following statements are stated according to some embodiments of the present invention. The core controller 130 is configured for performing the following steps. Firstly, it monitors the utilization UZ of the multi-core processor 100. Secondly, it calculates a target performance index according to the utilization UZ of the multi-core processor 100, a target utilization and a first performance index, wherein the first performance index is associated with a first entry of a DVFS table that corresponds to a current setting for the multi-core processor 100. Thirdly, it selects a second entry of the DVFS table that corresponds to a target-setting according to the target performance index and a second performance index that is associated with the second entry. The target-setting is further used to configure the multi-core processor 100. Also, according to one embodiment of the invention, the second performance index is greater than the target performance index. According to another embodiment of the invention, the core controller 130 calculates the target performance index further according to a run queue length of the computing system.

In one embodiment, the core controller 130 is further configured for generating the DVFS table, wherein the first entry records the current setting and the first performance index, and the second entry records the target-setting and the second performance index. The first entry records a first power index, the second entry further records a second power index, and the second power index is smaller than a power budget of the computing system 10. The core controller 130 generates the DVFS table based on a thread level parallelism (TLP) of the computing system 10 so that the DVFS table can be partitioned into a plurality of sub-tables, wherein each of the sub-tables corresponds to a different TLP value and comprises a plurality of entries. Also, when the TLP changes to a first TLP value, the core controller 130 selects the second entry from a first sub-table of the DVFS table that corresponds to the first TLP value.

According to an embodiment of the present invention, the core controller 130 is also for determining whether the TLP of the computing system 10 changes or the utilization UZ of the multi-core processor 100 lies outside a target range, and the core controller 130 calculates the target performance index when determining that the TLP of the computing system changes or the utilization of the multi-core processor lies outside the target range. That is, if the utilization UZ of the multi-core processor 100 falls within an acceptable range and the TLP of the computing system 10 remains unchanged, the core controller 130 doesn't need to calculate the target performance index for determining another setting for the multi-core processor 100.

According to an embodiment of the present invention, the multi-core processor 100 has one or more first cores (110-1 through 110-4) and one or more second cores (120-1 through 120-4), the current setting comprises a first setting for the first cores and a second setting for the second cores, and the target-setting comprises a third setting for the first cores and a fourth setting for the second cores. Furthermore, the first setting instructs all the first cores to turn on and the second setting instructs all the second cores to turn off, and the third setting instructs all the first cores to turn off and the fourth setting instructs all the second cores to turn on.

Compared to conventional multi-core management scheme where cores are usually turned on one after another (i.e. only one additional core is turned on for each adjustment), embodiments of the invention above illustrates flexible and strategic ways of multi-core management.

Figure 5:
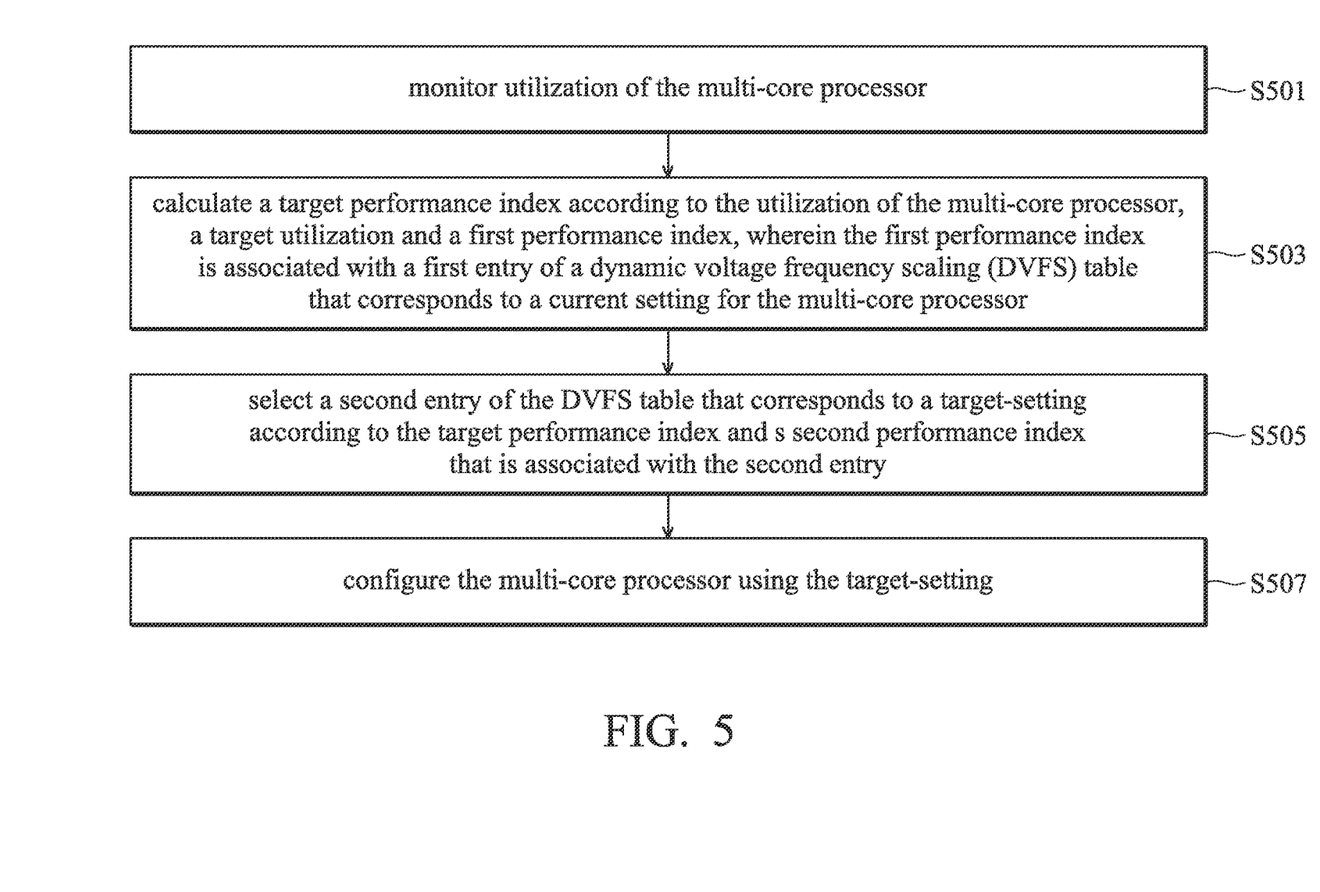
FIG. 5 gives a flow chart illustrating a method for controlling operation of the multi-core processor of FIG. 1 according to another embodiment of the invention.

FIG. 5 is a flow chart illustrating a method for controlling operation of a multi-core processor according to an embodiment of the invention. In step S501, utilization of the multi-core processor is monitored. In step S503, a target performance index is calculated according to the utilization of the multi-core processor, a target utilization and a first performance index, wherein the first performance index is associated with a first entry of a dynamic voltage frequency scaling (DVFS) table that corresponds to a current setting for the multi-core processor. Then, a second entry of the DVFS table that corresponds to a target-setting is selected according to the target performance index and a second performance index that is associated with the second entry (step S505). In step S507, the target-setting is also used to configure the multi-core processor.

The method in FIG. 5 may be performed by hardware (e.g., circuitry, dedicated logic, programmable logic, microcode, application specific integrated circuits (ASICs), field-programmable gate arrays (FPGAs), etc.), software (e.g., instructions run on a processing device), or a combination thereof. In one embodiment, the method is performed by the core controller 130 of the computing system 10 of FIG. 1.

The operations of the flow diagram of FIG. 5 have been described with reference to the exemplary embodiments of FIGS. 1, 4A and 4B. However, it should be understood that the operations of the flow diagrams of FIG. 5 can be performed by embodiments of the invention other than those discussed with reference to FIGS. 1, 4A and 4B, and the embodiments discussed with reference to FIGS. 1, 4A and 4B can perform operations different than those discussed with reference to the flow diagrams. While the flow diagrams of FIG. 5 show a particular order of operations performed by certain embodiments of the invention, it should be understood that such order is exemplary (e.g., alternative embodiments may perform the operations in a different order, combine certain operations, overlap certain operations, etc.).

The method according to the above-described embodiments may be recorded in non-transitory computer-readable media including program instructions to implement various operations embodied by a computer. The media may also include, alone or in combination with the program instructions, data files, data structures, and the like. The program instructions recorded on the media may be those specially designed and constructed for the purposes of embodiments, or they may be of the kind well-known and available to those having skill in the computer software arts. Examples of non-transitory computer-readable media include magnetic media such as hard disks, floppy disks, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like. The computer-readable media may also be a distributed network, so that the program instructions are stored and executed in a distributed fashion. The program instructions may be executed by one or more processors. The computer-readable media may also be embodied in at least one application specific integrated circuit (ASIC) or Field Programmable Gate Array (FPGA), which executes (processes like a processor) program instructions. Examples of program instructions include both machine code, such as produced by a compiler, and files containing higher level code that may be executed by the computer using an interpreter.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and

What is claimed is:

1. A computing system comprising:
 a multi-core processor having a plurality of processor cores organized into processor core groups according to performance, wherein a first processor core group has at least two higher-performance processor cores and a second processor core group having at least two higher-efficiency processor core, wherein the performance of each processor core in the first processor core group is greater than the performance of each processor core in the second processor core group, wherein the multi-core processor is configured to calculate a current thread level parallelism (TLP) of the computing system according to a sum of a workload of active higher-performance processor cores in the first processor core group and active higher-efficiency processor cores in the second processor core group;
 a core controller configured to:
  monitor a utilization of the plurality or processor cores;
  calculate a target performance index according to the utilization of the plurality of processor cores, a target utilization and a first performance index, wherein the first performance index is associated with a first entry of a dynamic voltage frequency scaling (DVFS) table that corresponds to a current setting for the plurality of processor cores; and
  select a second entry of the DVFS table that corresponds to a target-setting according to the target performance index and a second performance index that is associated with the second entry,
 wherein the core controller generates the DVFS table based on the TLP, and
 wherein the target-setting is used to configure the plurality of processor cores of the multi-core processor, such that either:
  (1) an operating frequency applied to the plurality of processor cores of the first group of processor cores is different than an operating frequency applied to the plurality of processor cores of the second group of processor cores, or
  (2) an operating voltage applied to the plurality of processor cores of the first group of processor cores is different than an operating voltage applied to the plurality of processor cores of the second group of processor cores.

2. The computing system of claim 1, wherein the second performance index is greater than the target performance index.

3. The computing system of claim 1, wherein the core controller calculates the target performance index further according to a run queue length of the computing system.

4. The computing system of claim 1, wherein the core controller is further configured for generating the DVFS table, wherein the first entry records the current setting and the first performance index, and the second entry records the target-setting and the second performance index.

5. The computing system of claim 4, wherein the first entry further records a first power index, the second entry further records a second power index, and the second power index is smaller than a power budget of the computing system.

6. The computing system of claim 4, wherein the core controller partitions the DVFS table into a plurality of sub-tables, wherein each of the sub-tables corresponds to a different TLP value and comprises a plurality of entries.

7. The computing system of claim 6, wherein the core controller is further for determining whether the TLP of the computing system changes or the utilization of the multi-core processor lies outside a target range, and the core controller calculates the target performance index when determining that the TLP of the computing system changes or the utilization of the multi-core processor lies outside the target range.

8. The computing system of claim 6, wherein the core controller selects the second entry from a first sub-table of the DVFS table that corresponds to a first TLP value when determining that the TLP of the computing system changes to the first TLP value.

9. The computing system of claim 1, wherein the plurality of processor cores includes one or more first cores and one or more second cores, the current setting comprises a first setting for the first cores and a second setting for the second cores, and the target-setting comprises a third setting for the first cores and a fourth setting for the second cores.

10. The computing system of claim 9, wherein the first setting instructs all the first cores to turn on and the second setting instructs all the second cores to turn off, and the third setting instructs all the first cores to turn off and the fourth setting instructs all the second cores to turn on.

11. A method for controlling operation of a multi-core processor within a computing system, the multi-core processor having a plurality of processor cores organized into processor core groups according to performance, wherein a first processor core group has at least two higher-performance processor cores and a second processor core group having at least two higher-efficiency processor core, wherein the performance of each processor core in the first processor core group is greater than the performance of each processor core in the second processor core group, the method comprising:
 monitoring utilization of the plurality of processor cores;
 determining a sum of a workload of active higher-performance processor cores in the first processor core group and active higher-efficiency processor cores in the second processor core group and calculating a current thread level parallelism (TLP) of the computing system according to the sum;
 calculating a target performance index according to the utilization of the plurality of processor cores, a target utilization and a first performance index, wherein the first performance index is associated with a first entry of a dynamic voltage frequency scaling (DVFS) table that corresponds to a current setting for the plurality of processor cores;
 selecting a second entry of the DVFS table that corresponds to a target-setting according to the target performance index and a second performance index that is associated with the second entry, wherein the DVFS table is generated based on the TLP; and
 configuring the plurality of processor cores of the multi-core processor using the target-setting, such that either:
  (1) an operating frequency applied to the plurality of processor cores of the first group of processor cores is different than an operating frequency applied to the plurality of processor cores of the second group of processor cores, or (2) an operating voltage applied to the plurality of processor cores of the first group of processor cores is different than an operating voltage applied to the plurality of processor cores of the second group of processor cores.

12. The method of claim 11, wherein the second performance index is greater than the target performance index.

13. The method of claim 11, wherein the target performance index is calculated further according to a run queue length of the computing system.

14. The method of claim 11, wherein the first entry records the current setting and the first performance index, and the second entry records the target-setting and the second performance index.

15. The method of claim 14, wherein the first entry further records a first power index, the second entry further records a second power index, and the second power index is smaller than a power budget of the computing system.

16. The method of claim 14, wherein the DVFS table is partitioned into a plurality of sub-tables, wherein each of the sub-tables corresponds to a different TLP value and comprises a plurality of entries.

17. The method of claim 16, further comprising:
determining whether the TLP of the computing system changes or the utilization of the multi-core processor lies outside a target range; and
calculating the target performance index when determining that the TLP of the computing system changes or the utilization of the multi-core processor lies outside the target range.

18. The method of claim 16, wherein the second entry is selected from a first sub-table of the DVFS table that corresponds to a first TLP value when the TLP of the computing system changes to the first TLP value.

19. The method of claim 11, wherein the plurality of processor cores includes one or more first cores and one or more second cores, the current setting comprises a first setting for the first cores and a second setting for the second cores, and the target-setting comprises a third setting for the first cores and a fourth setting for the second cores.

20. A computing system comprising:
a multi-core processor having a plurality of processor cores organized into processor core groups according to performance, wherein a first processor core group has at least two higher-performance processor cores and a second processor core group having at least two higher-efficiency processor core, wherein the performance of each processor core in the first processor core group is greater than the performance of each processor core in the second processor core group, wherein the multi-core processor is configured to calculate a current thread level parallelism (TLP) of the computing system according to a sum of a number of active higher-performance processor cores in the first processor core group and a number of active higher-efficiency processor cores in the second processor core group;
a core controller configured to:
monitor a utilization of the plurality or processor cores;
calculate a target performance index according to the utilization of the plurality of processor cores, a target utilization and a first performance index, wherein the first performance index is associated with a first entry of a dynamic voltage frequency scaling (DVFS) table that corresponds to a current setting for the plurality of processor cores; and
select a second entry of the DVFS table that corresponds to a target-setting according to the target performance index and a second performance index that is associated with the second entry,
wherein the core controller generates the DVFS table based on the TLP; and
wherein the target-setting is used to configure the plurality of processor cores of the multi-core processor, such that either:
(1) an operating frequency applied to the plurality of processor cores of the first group of processor cores is different than an operating frequency applied to the plurality of processor cores of the second group of processor cores, or
(2) an operating voltage applied to the plurality of processor cores of the first group of processor cores is different than an operating voltage applied to the plurality of processor cores of the second group of processor cores.

* * * * *